Nov. 18, 1969    G. B. KARNOFSKY    3,478,531
SALINE WATER CONVERSION SYSTEM
Filed July 22, 1966    4 Sheets-Sheet 1
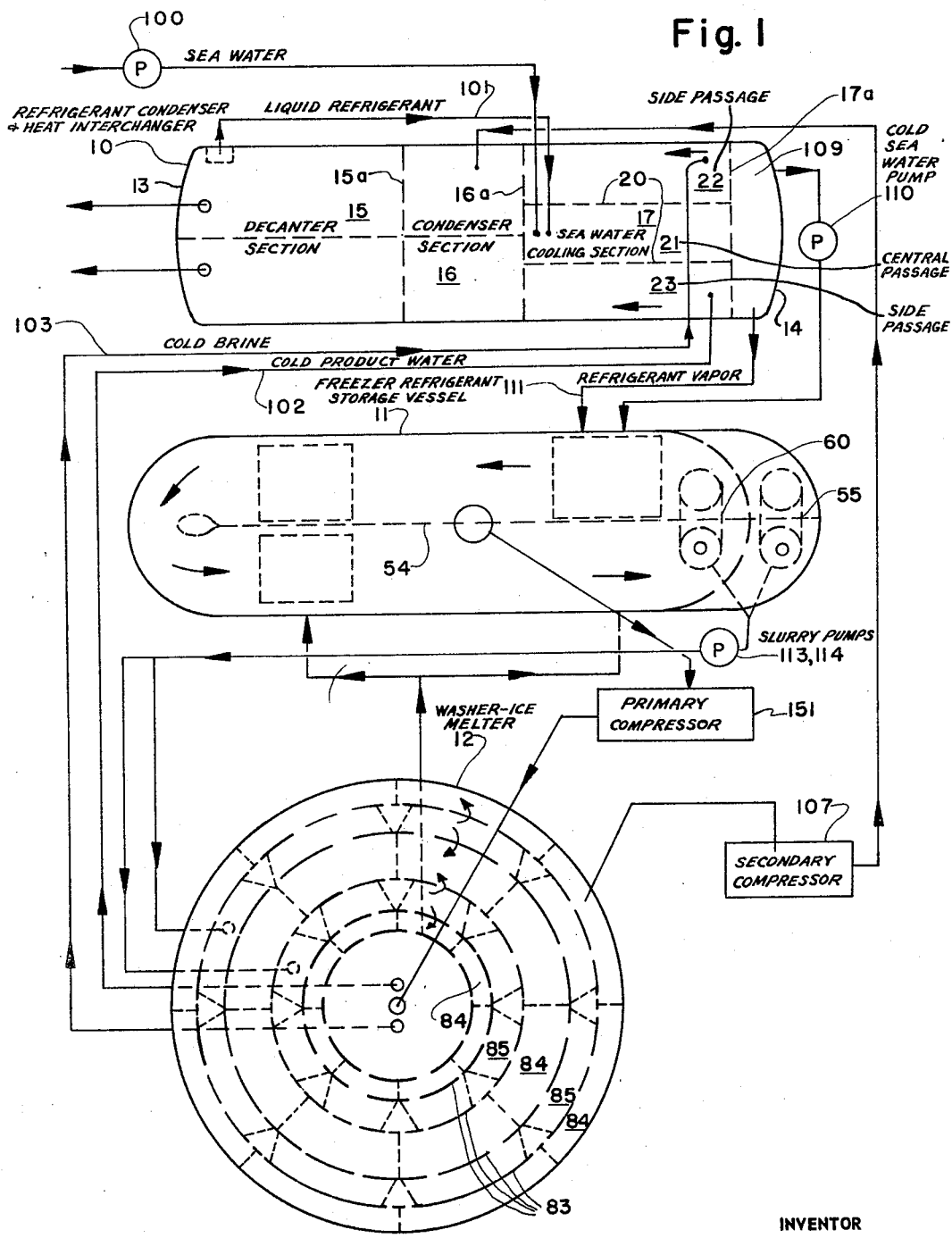
Fig. I
INVENTOR
George B. Karnofsky
by Hoopes, Leonard & Buell
his Attorneys

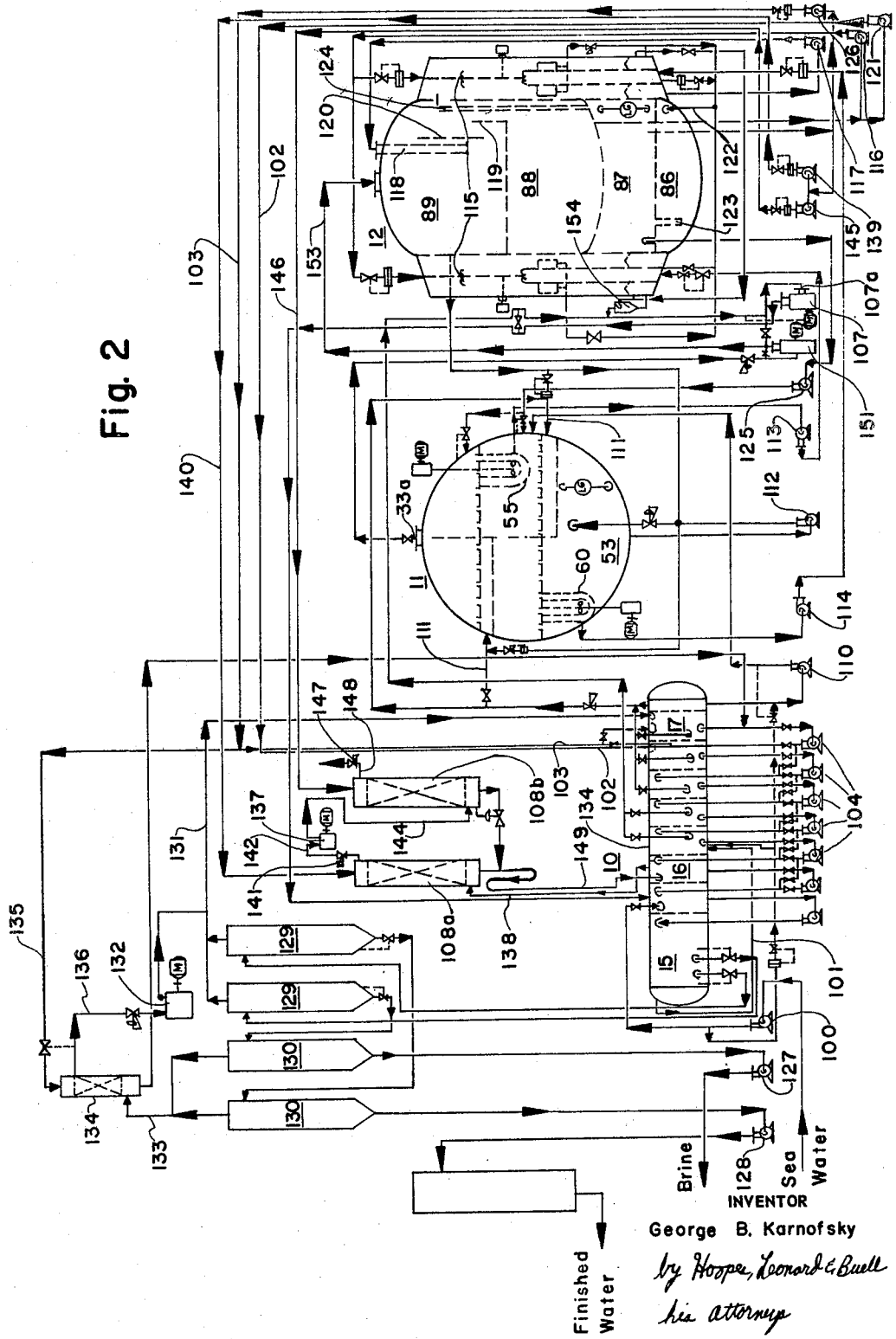

Nov. 18, 1969  G. B. KARNOFSKY  3,478,531
SALINE WATER CONVERSION SYSTEM
Filed July 22, 1966  4 Sheets-Sheet 3
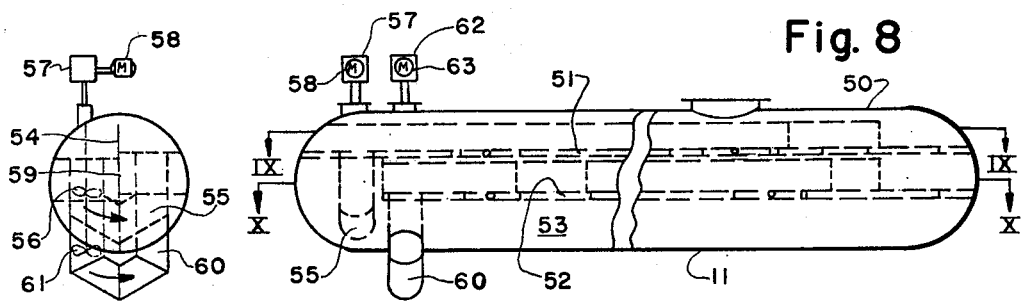
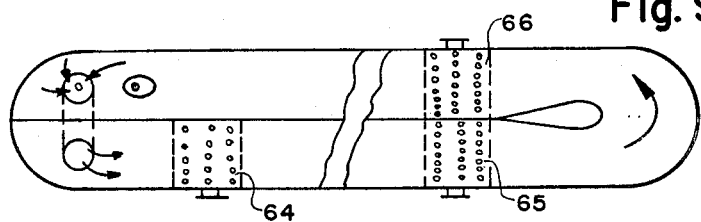
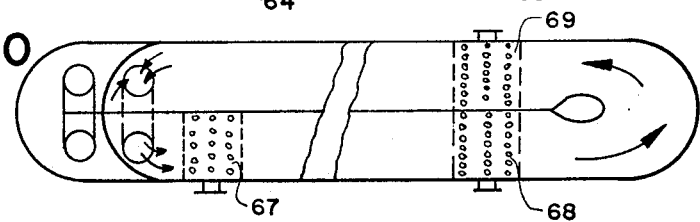
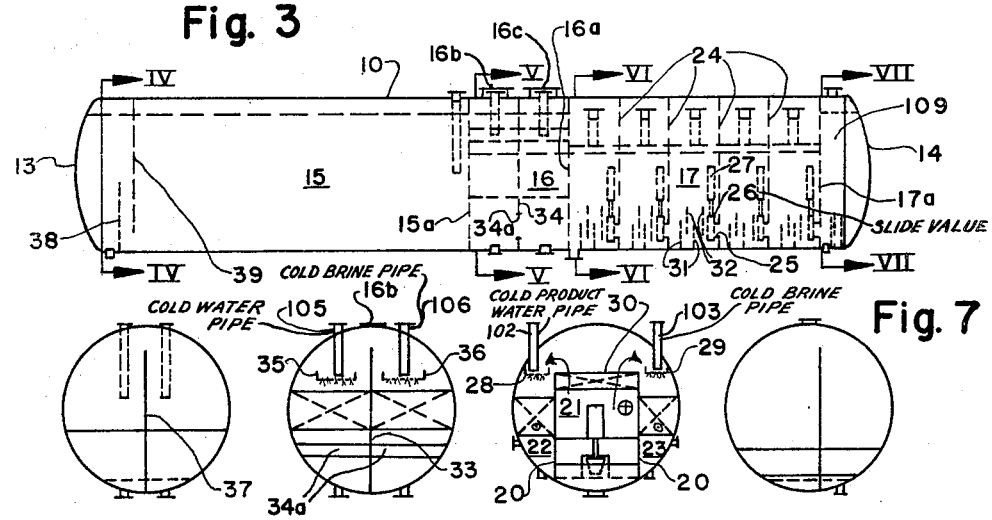
INVENTOR
George B. Karnofsky
by Hoopes, Leonard & Buell
his Attorneys Nov. 18, 1969  G. B. KARNOFSKY  3,478,531
SALINE WATER CONVERSION SYSTEM Filed July 22, 1966  4 Sheets-Sheet 4

INVENTOR
George B. Karnofsky
by Hoopes, Leonard & Buell
his Attorneys

United States Patent Office 3,478,531
Patented Nov. 18, 1969

3,478,531
SALINE WATER CONVERSION SYSTEM
George B. Karnofsky, Mount Lebanon Township, Allegheny County, Pa., assignor to Blaw-Knox Company, Pittsburgh, Pa., a corporation of Delaware
Filed July 22, 1966, Ser. No. 567,201
Int. Cl. C02b 1/12; B01d 9/02
U.S. Cl. 62—123                              3 Claims

ABSTRACT OF THE DISCLOSURE

An apparatus and method are provided for saline water conversion by freezing comprising means for making ice by vaporization of refrigerant in direct contact with saline water, a primary compressor, a secondary compressor, a single vessel incorporating means for ice washing and means for ice melting by contact with refrigerant vapor from the primary compressor, single vessel means for heat interchange between feed saline water and product water and brine and for condensation of refrigerant vapor from the secondary compressor, connections through the primary compressor from the means for making ice to the single vessel ice washing means and connections through the secondary compressor from the single vessel ice washing and melting means to the single vessel heat interchange means.

---

This invention relates to saline water conversion apparatus and particularly to a plant for freeze separation of water from an aqueous saline solution in a continuously operating system. More particularly, this invention relates to a partial freezing system in which ice crystals are formed and grown to facilitate the production of potable non-saline water from saline waters such as sea or brackish waters, utilizing an immiscible vaporizable liquid to effect partial freezing of the saline water.

The apparatus of this invention for the production of useful fresh water, such as potable water, from unusable sea or brackish waters provides many advantages and unique structural and operative advantages over prior art practices for the same purpose. Many reports, published by the Office of Saline Water of the United States Department of Interior, outline the problems of desalination of sea water and the various attempts which have been made to produce useful fresh water from saline waters. The various problems involved in desalination are so commonly recognized that there is no necessity for delineating them in this application.

In the process which is the subject matter of the invention, potable water is made from sea water or brackish water by partial freezing employing an immiscible vaporizable refrigerant such as normal butane. Ice slurry is produced in a freezer by direct contact of saline water with refrigerant liquid, which is vaporized. The resulting slurry of ice in brine is sent to a washer, where the ice is washed substantially free of salt, using part of the melted ice as the wash liquid. Washed ice then passes to a melter, where it is brought into direct contact with slightly compressed refrigerant vapor from the freezer. Refrigerant vapor condenses as it melts the ice; and the condensate is recycled to the freezer. This system employs four major elements: a freezer, a washer, a melter and a primary compressor. Norwegian Patent No. 70,507, issued June 3, 1946, is cited as a general disclosure of such systems. It is essential that there also be a heat interchanger between the incoming saline water and the product brine and potable water in order to recover the cold from the products into the incoming feed. Since the system operates below ambient temperature, and since heats of compression and heat in the feed salt water must be removed, there is required also an auxiliary refrigerant system, which is conveniently a secondary compressor, by which refrigerant vapor not condensed in the melter is compressed to a pressure at which it can be condensed by cooling water. Also there is of necessity an auxiliary system for stripping product brine and potable water of their residual refrigerant content, and also an auxiliary system for recovering refrigerant from non-condensible gases that are vented.

In a preferred embodiment of my invention, I provide a saline water freeze conversion apparatus in which the organization is such that there are required only three major vessels of unique construction. The three major vessels are designed to combine particular equipment requirements of the various process steps in a new way such that the entire system is fully provided in a thermodynamically economical manner at a low capital cost. Preferably, I provide a cylindrical refrigerant condenser and heat interchanger receiving product water and brine on the one hand and sea water mixed with refrigerant on the other hand, and cooling sea water by heat exchange with said product water and brine, a cylindrical freezer and refrigerant storage tank in which liquid refrigerant is contacted with sea water to produce ice and refrigerant vapor and a generally cylindrical melter-washer and storage vessel. Preferably, the refrigerant condenser and heat interchanger include a condenser and decanter for the liquid refrigerant as well as the heat interchanger portions.

In the foregoing general statement, I have set out certain objects, purposes and advantages of my invention. Other objects, advantages and purposes of this invention will be apparent from a consideration of the following description and the accompanying drawings in which:

FIGURE 1 is a schematic flow diagram in plan of an apparatus according to my invention;

FIGURE 2 is an elevation diagram of apparatus according to my invention;

FIGURE 3 is an enlarged side elevation of the refrigerant condenser and heat interchanger of FIGURES 1 and 2;

FIGURE 4 is a section on the line IV—IV of FIGURE 3;

FIGURE 5 is a section on the line V—V of FIGURE 3;

FIGURE 6 is a section on the line VI—VI of FIGURE 3;

FIGURE 7 is a section on the line VII—VII of FIGURE 3;

FIGURE 8 is a side view of the freezer and refrigerant storage vessel of FIGURES 1 and 2;

FIGURE 9 is a section on the line IX—IX of FIGURE 8;

FIGURE 10 is a section on the line X—X of FIGURE 8;

FIGURE 11 is an end view of FIGURE 8;

Figure 13:
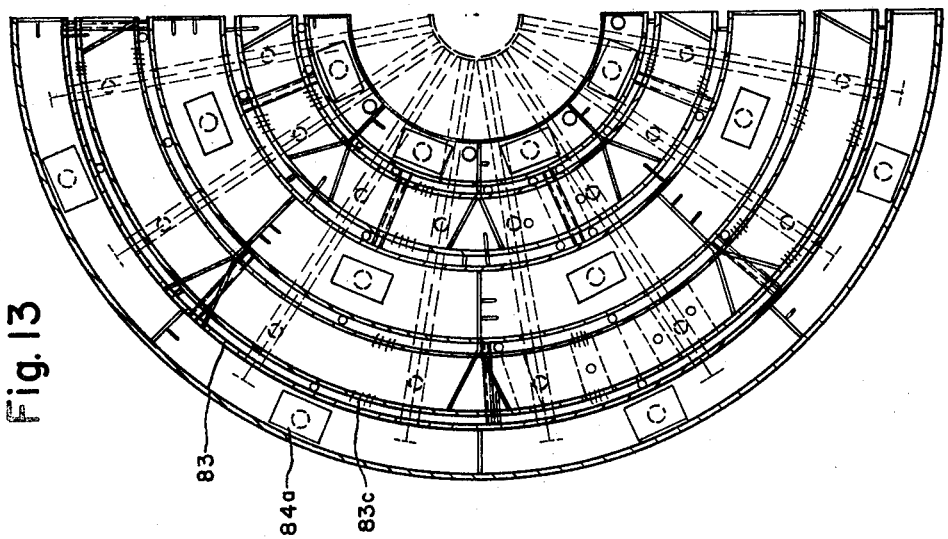
FIGURE 13 is a section on the line XIII—XIII of FIGURE 12.
Figure 12:
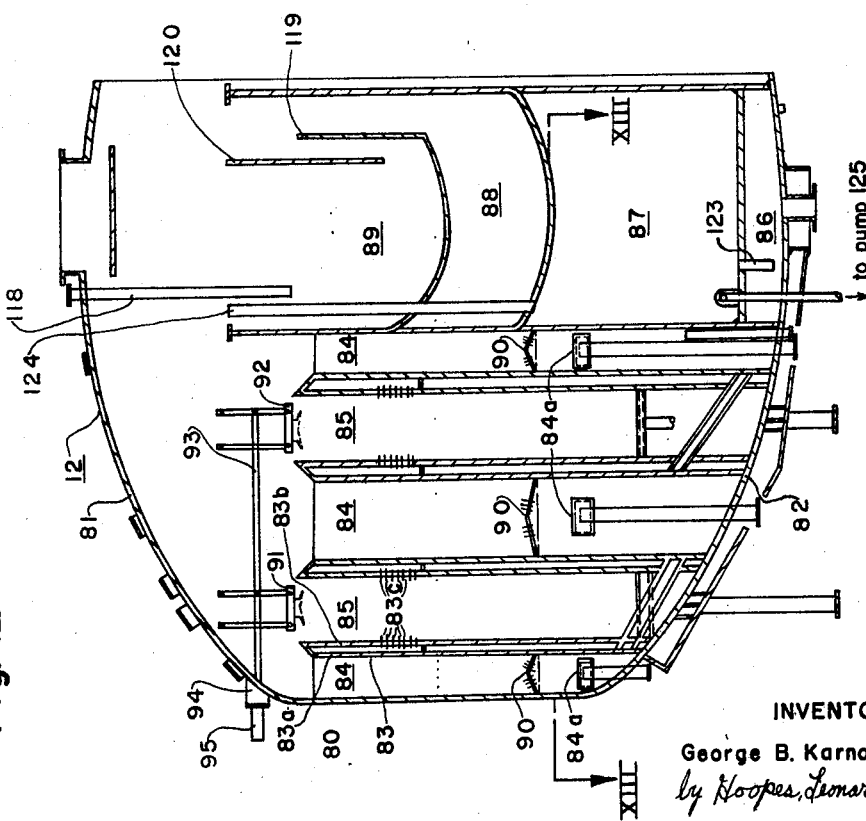
FIGURE 12 is a vertical longitudinal section of the washer melter and storage tank member of FIGURES 1 and 2.

Referring to FIGURE 1, I have illustrated diagrammatically the elements of equipment for the process previously referred to. There is a freezer, more specifically designated as the freezer and refrigerant storage vessel 11; there are an ice washer and a melter, specifically designated as the washer-ice melter 12. There is a primary compressor 131 which compresses refrigerant vapor generated at the freezer so that the vapor can condense in the melter. There is an auxiliary refrigeration compressor, designated as the secondary compressor 107, which compresses refrigerant vapor not condensed in the melter so that it can condense in the direct contact condenser which is part of the vessel designated as the refrigerant condenser and heat interchanger 10. The vessel 10 also includes the means for heat interchange between the product brine and potable water and the feed saline water.

The refrigerant condenser and heat exchanger 10 is in the form of a cylindrical tank closed at each end by end bells 13 and 14. The condenser and heat exchanger is divided lengthwise into three general areas, decanter section 15, condenser section 16 and a sea water cooling section 17 by divider plates 15a, 16a and 17a. The sea water cooling section 17 is divided lengthwise by two upstanding walls 20 defining a central passage 21 and two side passages 22 and 23. As shown more particularly in FIGURES 3–7 inclusive, the passages 21, 22 and 23 are broken into cells by transverse walls 24 which intersect walls 20. Each of the walls 24 is provided with a passage opening 25 having a slide valve 26 operated by a hydraulic cylinder 27. Distributor trays 28 and 29 extend lengthwise of passages 22 and 23. A demister 30 is provided above central passage 21. Transverse baffles 31, 32 are paired in each cell to cause mixing of the sea water with the refrigerant and therefore better heat exchange contact. The condenser section 16 is divided lengthwise by a wall 33 and is subdivided by a transverse wall 34 into four cells connected in pairs by opening 34a in 34. Distributor trays 35 and 36 are provided above the cells parallel to longitudinal wall 33. The decanter section 15 is divided by a longitudinal wall or baffle 37 extending the full length thereof. Two transverse baffles 38 and 39 at the end adjacent bell 13 aid in maintaining a proper interface level and provide a seal for the decanting section and a weir for the decanting function.

The refrigerant storage and freezer vessel has an elongated cylindrical housing 50 provided with a top freezer tray 51, an intermediate freezer tray 52 and a bottom storage area 53. The storage area 53 is used for containing the supply of refrigerant during periods of shut down, at which time the supply may extend from the bottom of vessel 11 to a level just below the top freezer tray 51, the intermediate freezer tray 52 being submerged in refrigerant until the level dips below it during start up as later described. The freezer tray 51 is defined by the housing walls and a central baffle 54 running lengthwise from one end of housing 50 to a point spaced from the opposite end so as to form a horseshoe or U-shaped path of travel. The two ends of freezer tray 51 at the ends of the U are connected by a depending U-shaped return bend tube sump 55 provided with impeller 56 driven through a gear reducer 57 and motor 58. Preferably the U-shaped deck or tray 51 is higher at one end than at the other as indicated in FIGURE 11 to provide a downward inclination from the upstream end to the downstream end of the tray and thereby provide a gradient to match the lost head which occurs when a slurry on tray 51 makes the 180° bend at the bottom end of the U-shaped tray. The intermediate tray 52 is constructed identically with tray 51 defined by the housing walls and a central baffle 59 and is provided with a connecting U-shaped return bend tube sump 60 having impeller 61 driven through gear reducer 62 and motor 63. A refrigerant sparge section 64 is provided downstream from the sump in tray or deck 51 together with auxiliary sparge sections 65 and 66 adjacent the return bend of tray 51. Tray 52 has a similar sparge section 67 downstream from sump 60 together with supplemental sparge sections 68 and 69 adjacent the return bend.

The washer melter vessel 12 has an outer generally vertically cylindrical housing 80 having top 81 and bottom 82 hemi-spherical ends. Internally spaced cylindrical walls 83 divide the interior of the housing into alternate melter zones 84 and washer zones 85 and a central storage and decanter zone made up of a superposed brine decanter 86, brine surge tank 87, water storage tank 88 and water decanter 89. Each of the walls 83 is made up of a pair of spaced members 83a and 83b, one of which, 83b, is perforated in a zone near the top and lies adjacent to the washer zone 85. The perforated member and the space within the wall provide a passage for removal of brine and wash water from the ice in the washer zone. Screens 90 are provided intermediate the top and bottom of each melter zone to support the ice being melted. Radially movable plows 91 and 92 are mounted above each of the washer zones on a reciprocable shaft 93. Shaft 93 is connected at one end to a hydraulic piston 94 in cylinder 95 for movement of plows 91 and 92 to move washed ice alternately from one side and then the other of washer zones 85 into adjacent melter zones 84 on either side of the washer zone.

The operation of the apparatus of this invention is as follows. When start up has been completed and the system is in normal operation, sea water is pumped by pump 100 into passage 21 of the refrigerant condenser and heat exchanger unit 10. Liquid refrigerant is introduced into the sea water in passage 21 through line 101 from decanter section 15. Heat is interchanged from the sea water stream in the several stages of passage 21 to the brine stream and the product water streams in passages 23 and 22 respectively by employing vaporizing and condensing refrigerant as an intermediate heat transfer medium. Liquid refrigerant entering passage 21 is evaporated by direct contact with the sea water, extracting heat therefrom in the form of heat of vaporization of the refrigerant. This occurs stage by stage in the several compartments into which passage 21 is broken and through which the sea water and liquid refrigerant both flow. The pressure in the compartments is successively lower in the direction of sea water flow. Refrigerant vapor passes upwardly through a packed entrainment separator, demister 30 and laterally to each side where it is contacted by cold product water introduced by pipe 102 onto perforated distributor tray 28 and cold brine introduced by pipe 103 onto perforated distributor tray 29 respectively to which the refrigerant vapor gives up its heat of vaporization as it is condensed. The method of heat exchange involved, namely the stage-by-stage evaporation of a vaporizable fluid directly from the liquid stream being cooled and condensing the fluid directly in the liquid stream being warmed is disclosed in Lewis et al. Patent 2,749,094 issued June 5, 1956, entitled Method of Heat Exchange Between Liquids, and is not per se my invention. Each of the cold water and the brine are pumped from the heat interchanger section 17 by the last of heat interchanger stage pumps 104 to the condenser section 16 where refrigerant vapor is again contacted with cold water and cold brine delivered by pipes 105 and 106 respectively onto perforated distributor trays 35 and 36. The above described heat interchanger may, for example, be comprised of from five to seven stages with a 10° F. approach. Each stage is vented to the next lower pressure stage, in the direction of saline water flow along passage 21 and finally into the flash chamber 109. The pressure in each stage adjusts itself. The pressures, using normal butane as the refrigerant, would thus decrease from stage to stage from about 30 p.s.i.g. at the saline water feed end to somewhat over 600 mm. Hg absolute at the flash chamber 109 (which vents to the freezer at 600 mm. Hg absolute.

Refrigerant vapor is delivered to the condenser section 16 from secondary compressor 107 as shown in FIGURES 1 and 2 and is condensed with the product water and brine after heat interchange with the sea water as described above. The condenser section 16 is vented to the low pressure vent scrubber 108a. In the four-cell condenser section 16 illustrated in FIGURES 3 and 5, refrigerant vapor enters one pair of cells through the common inlet nozzle 16b at the top, and passes concurrently with the cold condensing liquid through packing below the distributor trays 35 and 36, and any remaining uncondensed vapor thence passes through the openings 34a into the other pair of cells and passes upward into or through the packing countercurrent to the cold condensing liquid from distributor trays 35 and 36. Noncondensible vapor and gas leave the condenser section 16 through nozzle 16c, which is connected to the vent scrubber 108a.

Liquid refrigerant, brine and product water from the bottom of condenser section 16 are transferred to the decanter section 15 where liquid refrigerant is removed as overflow and is conducted to the first interchange stage of heat exchanger 17 through line 101 as described above. The refrigerant liquid overflow is in excess of the refrigerant evaporated in the several heat interchanger stages of section 17 and the excess from stage to stage flows concurrently with the sea water through the valved opening 25 and finally into flash chamber 109 from which the cold sea water with residual liquid refrigerant is pumped to pump 110 to the freezer-storage unit 11. The flash chamber 109 generates vapor used in the freezer for sparging as hereafter described.

Cold sea water entering freezer vessel 11 is delivered onto trays 51 and 52 from pump 110 at a point adjacent the sparge sections 64 and 67. Refrigerant vapor is delivered to sparge sections 64 and 67 as well as intermediate sparge sections 65–66 and 68–69 from the flash chamber by lines 111. Liquid refrigerant is supplied to sparge sections 64 and 67 as well as intermediate sparge sections 65–66 and 68–69 from the bottom chamber 53 of the freezer storage unit by refrigerant recycle pump 112. Vaporization of refrigerant removes heat from the sea water on trays 51 and 52 forming ice crystals in brine slurry. The slurry moves around the tray to the intake end of U-shaped sumps 55 and 60 where it is forced downwardly through the sump by impellers 56 and 61 and back to the upstream end of trays 51 and 52. A portion of the slurry is withdrawn from the bottom of each U sump 55 and 60 by slurry pumps 113 and 114 respectively. The remaining slurry is recirculated for crystal growth as disclosed in Dunn application Ser. No. 521,777, filed Jan. 20, 1966, now Patent No. 3,304,734.

The withdrawn slurry is pumped to washer-melter 12 where it is discharged into the bottom of washer sections 85 of the kind disclosed and claimed in Wiegandt patent application Ser. No. 102,583, filed Apr. 12, 1961, now abandoned and the continuation thereof, Ser. No. 419,289, filed Dec. 14, 1964, now Patent No. 3,251,193.

These washer sections 85 are in the form of columns into the lower portion of which the slurry is fed to move upwardly therein. The ice particles in the slurry form into upwardly moving consolidated porous beds in the columns. The liquid brine in the slurry passes into the ice bed in a concurrent direction relative to the upward movement of the bed, moving somewhat faster than the ice and is withdrawn from said column between the walls 83a and 83b at a location intermediate the top and bottom of said bed through orifices 83c. Wash water from feed pump 116 is applied to the top of the ice bed in the columns by the spray heads 115, to pass thereinto in a countercurrent direction relative to the upward movement of the ice bed and thereby wash the ice in the upper portion thereof. The washed ice is fragmented and radially removed from the top of the beds radially by the plows 91 and 92, as the beds move upwardly, and fall over the walls 83 into the melter compartments 84 which are provided on each side of the washer columns 85. The ice melts to produce product water falling through screens 90 into collection chambers 84a in the bottom of the melter section. Product water mixed with liquid refrigerant is pumped from chamber 84a by pump 117 into the water decanter section 89 through pipe 118. Water is decanted over weir 119 while separated refrigerant is held on the top of the water by baffle 120. Decanted water goes over weir 119 into water storage tank 88 from which it may be pumped by pump 121.

Brine from the washer zone is collected from between walls 83a and 83b and delivered by line 122 to the brine decanter 86. In brine decanter 86 refrigerant entrained in the brine rises to the top and the brine is fed through standpipe 123 from adjacent the bottom of brine decanter 86 into brine surge tank 87. A vent pipe 124 extends from the brine surge tank through the product water storage and product water decanter to vent near the top of the interior of the housing. Brine from brine surge tank 87 may be recycled to the freezer by pump 125 or it may be pumped by pump 126 to the sea water cooler section 17 of the refrigerant condenser and heat exchanger 10 to function in the manner described hereinabove after which it is pumped to discharge by pump 127. Product water is pumped by pump 121 to the sea water cooler section 17 of refrigerant condenser and heat exchanger 10 to function as previously described, after which it is pumped to storage by pump 128.

Both the brine and the product water leaving refrigerant condenser and heat exchanger 10 go to primary refrigerant strippers 129, thence to secondary refrigerant strippers 130 before going to pumps 127 and 128 respectively. Refrigerant vapors from the primary strippers flow through line 131 to the low temperature end of the heat interchanger vessel 34. Refrigerant vapors from the secondary strippers flow through line 133 to the stripper scrubber 134 where they are countercurrently cooled with cold brine flowing through line 135 from the reject brine pump 126. Vapor from the scrubber 134 flows through line 136 to the debutanizer compressor 132 to line 131.

The entire system is vented through the vent scrubbing system comprising the vent scrubbers 108a and 108b and vent compressor 137. The mixture of refrigerant vapor and air leaving the condenser-heat interchanger 34 through line 138 enters the low-pressure vent scrubber 108a, where it is scrubbed with cold brine pumped by the low-pressure vent brine pump 139 through line 140 to the top of the scrubber. Vapors vented from scrubber 108 through the pressure controller 141 in line 142 are compressed by vent compressor 137 and flow through line 144 to high-pressure vent scrubber 108b where they are further scrubbed with brine pumped by the high-pressure brine vent pump 145 through line 146. In the high-pressure vent scrubber 108b additional refrigerant vapor is condensed by the cold brine. Inert gas, denuded of refrigerant vapor, is vented to atmosphere through pressure controller 147 in line 148. Refrigerant condensed in the vent scrubbers 108a and 108b returns to vessel 34 through line 149. By using cold brine rejected from the washer-melter unit in the scrubber 108a, the volume of vent gases is reduced due to the low temperature of the cold brine and the size of the vent compressor required is correspondingly reduced.

Vapor from the primary compressor 151 is delivered by line 153 to the top of the washer melter 12. Compressed vapor is passed through the ice in the melter sections 84 where most of it condenses in melting the ice. Uncondensed vapor then proceeds through melter-vapor separator 154 into the inlet side of the secondary compressor 107.

Operation of the freezer vessel 11 was previously described. This operation may be described in greater detail as follows. It has been found in operation of the freezer disclosed in the co-pending Dunn application Ser. No. 521,777 that much higher capacities for ice manufacture are realized when the refrigerant sparged beneath the slurry, as disclosed by Dunn, is a mixture of liquid and vapor. Presumably, the turbulence caused by the introduction of vapor causes more intimate mixing of refrigerant liquid and slurry than would otherwise be possible. This applies equally well to the freezer shown in FIGURES 8–11 inclusive.

In the process disclosed by Norwegian Patent 70,507, and also as practiced in the use of my invention the feed sea water or brackish water leaving the heat interchanger will be at a temperature above that of the contents of any freezer of the type disclosed by Dunn. It is therefore possible to use this relatively warm feed as a source of heat for vaporization of refrigerant at a pressure higher than that existing in the freezer. Such vapor may then be used for sparging refrigerant liquid into the freezer. One method of doing this has already been disclosed, where sea water and liquid refrigerant from the heat interchanger section of vessel 34 flow to the flash chamber 109 wherein refrigerant vapor is generated by the cooling of the sea water at a pressure high enough so that the vapor may be used for sparging the freezer. This improvement is not limited in application by the specific means shown and described herein since it will be apparent to those skilled in the art that feed sea water or brackish water from any suitable heat interchanger can be mixed with refrigerant in a suitable vessel to generate refrigerant vapor at the desired pressure.

While in the preferred practice of the present invention it is not intended to effect any freezing of ice in the flash chamber 109, my invention contemplates that ice may be produced at the same time that refrigerant vapor is generated for sparging refrigerant into the freezers and contemplates the special case where two freezers may be employed, one of which generates the sparging vapor for use in the second. In such a case, the brine concentration in the first freezer is less than that in the second freezer, so that freezing occurs at a higher temperature in the first freezer. The pressure in the first freezer is correspondingly higher, so that refrigerant vapor generated in the first freezer can flow to the sparging zone of the second freezer.

On shutdown of the system all the refrigerant returns to the storage compartment 53 of the vessel 11. Startup is necessarily slow, as will be subsequently explained. Hence with the double-deck freezer only the top deck 51 is used for freezing in initial operation, admitting no water or brine to the lower deck 52. During this period, therefore, the lower deck 52 may be entirely flooded with refrigerant, i.e., the refrigerant may submerge the lower deck entirely. This level will drop as refrigerant used to freeze ice is transferred to the decanters and is absorbed by the ice in process. After the refrigerant level drops below the bottom of the lower deck, the operator may begin to use both decks for freezing. Hence the total available volume for refrigerant storage is the volume from the bottom to the top deck, with the lower deck submerged, the lower deck space being utilized for storage of refrigerant while it is not being used for freezing. Since the freezer must be designed to safely retain refrigerant vapor and a cylindrical vessel is ideal for this purpose, and since generally horizontal channels for the recirculating slurry of ice particles in brine during freezing occupy only a portion of the internal volume of such cylindrical vessel, the same vessel in this invention conveniently serves both for refrigerant storage and freezing, utilizing for storage initially the entire volume of the vessel up to the level of the upper deck, and in normal operation the level up to the lower deck.

The preferred method of start-up is as follows. Before the normal process cycle can be initiated, it is necessary that there be ice in the melter sections 84 of the washer-melter 12 capable of condensing the refrigerant vapor generated in the freezer 11 in excess of the vapor which flows to the secondary compressor 107. Since the refrigeration brought about by the operation of the secondary compressor 107 operating in conjunction with the condenser 16 is the only source of ice, the secondary compressor and condenser must of necessity be operated for some time in initial operation in order to accumulate ice in the freezer 11 and in the wash columns 85 of the water-melter 12 which must contain at least some ice before the ice can reach the melter compartments 84 of the washer-melter 12. There is no need for feeding sea water or brackish water to the system during this start-up period. To initiate operation, the upper tray 51 of the freezer and the wash columns 85 of the washer-melter are filled with water; and ice is made with only small addition of water to the system as necessary until ice accumulates in the melter compartments 84 of the washer-melter.

FIGURE 1 shows a preferred arrangement for operation where refrigerant vapor flows from the primary compressor 151 to the top of the washer-melter 12, downward through the melter compartments 84, and the uncondensed vapor flows from the bottom of the melter compartments 84 to the suction side of the secondary compressor 107. This is the preferred arrangement because it has been found in practice that melting in the compartments 84 is expedited by having the entire refrigerant vapor flow from the freezer supplied to them. In an alternative operation refrigerant vapor flowing to the secondary compressor 107 may be diverted from the suction side of the primary compressor 151.

It is characteristic of compressors such as primary compressor 151 that they have poor turn-down characteristics and cannot be operated at low rates such as are required during start-up, when there is no ice in the melter to condense vapor from the freezer. Therefore, during the start-up period the primary compressor 151 is not run and serves merely as part of the passage between the vapor outlet 33a at the top of the freezer and the suction inlet 107a of the secondary compressor 107. The system may in general be filled with salt water feed for start-up as previously described, but in the preferred arrangement, where all of the vapor from the freezer passes through the primary compressor 151 and the secondary compressor 107 is most practically designed to accept compressed vapor from the primary compressor, the system is filled with fresh water instead of salt water. By so doing, freezing can be accomplished at a higher pressure than would be the case if the system were filled with salt water, and the maximum capacity of the secondary compressor for producing ice can be realized. When ice has accumulated in the melter, normal operation is begun by increasing feed of refrigerant to the freezer, starting the primary compressor, and feeding saline water to the system.

I have described my invention without specifying the immiscible vaporizable refrigerant because the invention is not limited to any one refrigerant. A preferred refrigerant is normal butane because it has the least tendency of any of the cheap liquids that might be suitable to form undesirable high-melting hydrates with water.

The saline water conversion apparatus described hereinabove performs functions previously known in a more efficient manner and at less capital cost than any apparatus heretofore known in the art.

While I have illustrated and described a present preferred embodiment of my invention and its operation, it will be distinctly understood that this invention may be otherwise variously embodied within the scope of the following claims.

I claim:

1. Apparatus for saline water conversion by freezing comprising:
    (A) means for making ice by vaporization of refrigerant in direct contact with saline water,
    (B) primary compressor,
    (C) secondary compressor,
    (D) single vessel incorporating means for ice washing, and means for ice melting by contact with refrigerant vapor from the primary compressor,
    (E) single vessel means for heat interchange between feed saline water and product water and brine by vaporization of refrigerant in direct contact with saline water, and condensation of refrigerant in direct contact with product water and brine,
    (F) connections through the primary compressor from the means for making ice to the single vessel ice washing and melting means; and
    (G) connections through the secondary compressor from the single vessel ice washing and melting means to the single vessel heat interchange means.

2. Apparatus for partial freezing of saline water by direct contact with vaporizing refrigerant, comprising an elongated horizontal vessel, at least one generally horizontal tray in the vessel divided by a vertical longitudinal baffle to form a peripheral closed path for slurry circulation, a pump for circulating slurry in said closed peripheral path, means for feeding saline water to the closed path of circulation, means for removing ice-brine slurry from the circulating stream, and means for feeding liquid refrigerant to shallow compartments under perforated zones of the tray, each of said compartments formed by the plate of the tray and a parallel unperforated plate below it, and means for removing refrigerant vapor from each tray of the vessel.

3. The apparatus of claim No. 2 in which the portion of the vessel below the topmost tray is a storage chamber for liquid refrigerant.

References Cited

UNITED STATES PATENTS

| | | | |
|---|---|---|---|
| 3,079,761 | 3/1963 | Toulmin | 62—58 |
| 3,119,772 | 1/1964 | Hess et al. | 62—58 |
| 3,177,673 | 4/1965 | Svanoe | 62—58 |
| 3,205,672 | 9/1965 | Mohlan et al. | 62—58 |
| 3,217,505 | 11/1965 | Tuwiner | 62—58 |
| 3,304,734 | 2/1967 | Dunn | 62—58 |
| 3,314,881 | 4/1967 | Tuwiner | 62—58 |

FOREIGN PATENTS

| | | |
|---|---|---|
| 217,766 | 3/1958 | Australia. |
| 70,507 | 6/1946 | Norway. |

NORMAN YUDKOFF, Primary Examiner

U.S. Cl. X.R.

62—58